Patented Nov. 23, 1943

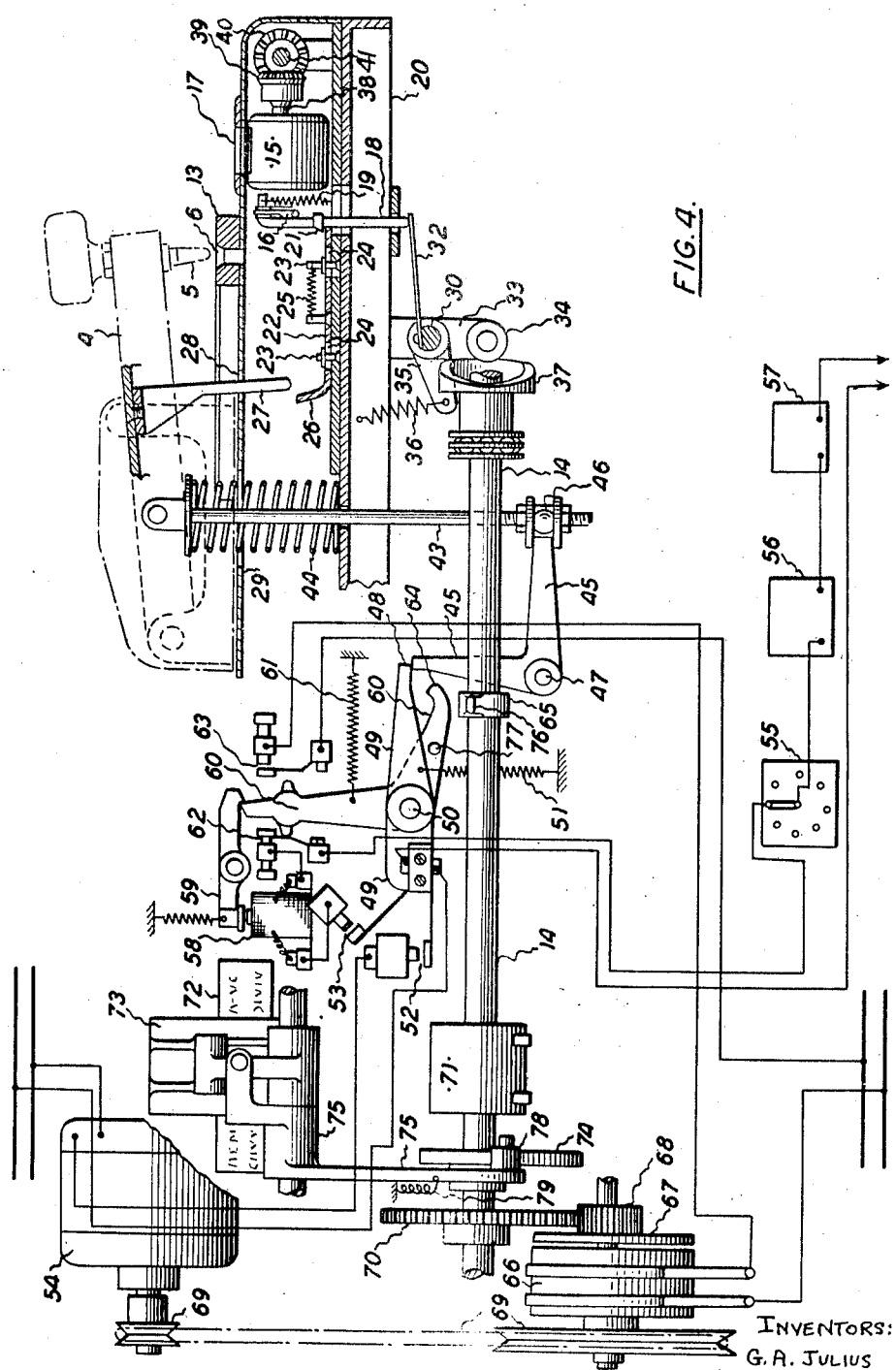

2,335,122

UNITED STATES PATENT OFFICE 2,335,122

TICKET ISSUE COUNTING MECHANISM FOR TOTALIZATORS

George Alfred Julius and Awdry Francis Julius, Sydney, New South Wales, Australia Application March 24, 1941, Serial No. 384,996
In Australia April 26, 1940

2 Claims. (Cl. 235—31)

This invention discloses an improvement of the device disclosed in Patent 1,744,771.

In existing totalizators it is customary to check the money receipts of the operator in charge of each ticket issuing machine and to provide a check against the grand total of transactions, by the provision of mechanism on each of the several machines which automatically counts the total number of tickets issued by the individual machine. In some cases it is required, not only to count the number of transactions effected through each machine, but also to count the composition of those transactions. For example in a totalizator issuing race betting tickets it may be required to count the total number of tickets issued by an individual machine for a particular event, or the fractions of that total which have been issued in respect of individual competitors in that event.

This invention has been devised to provide simple and effective means in a ticket issuing machine for separately counting the number of tickets issued in respect of each competitor.

As is well known, one form of ticket issuing machine includes a selector arm having a plunger thereon which is adapted to be thrust into any one of a plurality of dialling holes in a selector dial. Each of the dialling holes in use is peculiar to one competitor, and the act of thrusting the plunger into one of the holes initiates the operation of mechanism whereby a ticket is printed and issued in respect of the particular competitor, and of mechanism whereby the single transaction is summed into the total of transactions effected by all the ticket issuers in respect of that competitor.

According to this invention each dialling hole in a selector dial has individual counting mechanism associated therewith, whereby the act of entering the selector arm plunger in a particular dialling hole enables and initiates the operation of the mechanism in a manner whereby the issuance of the particular ticket corresponding to the selected dialling hole is counted on a counter which also corresponds with that hole.

An embodiment of the invention is illustrated in the accompanying drawings, in which:

Fig. 4 is a schematic layout illustrating the relationship between the mechanism subject of this invention and the relevant parts of a known form of ticket issuing machine to which the present invention is applicable.

Figure 1:
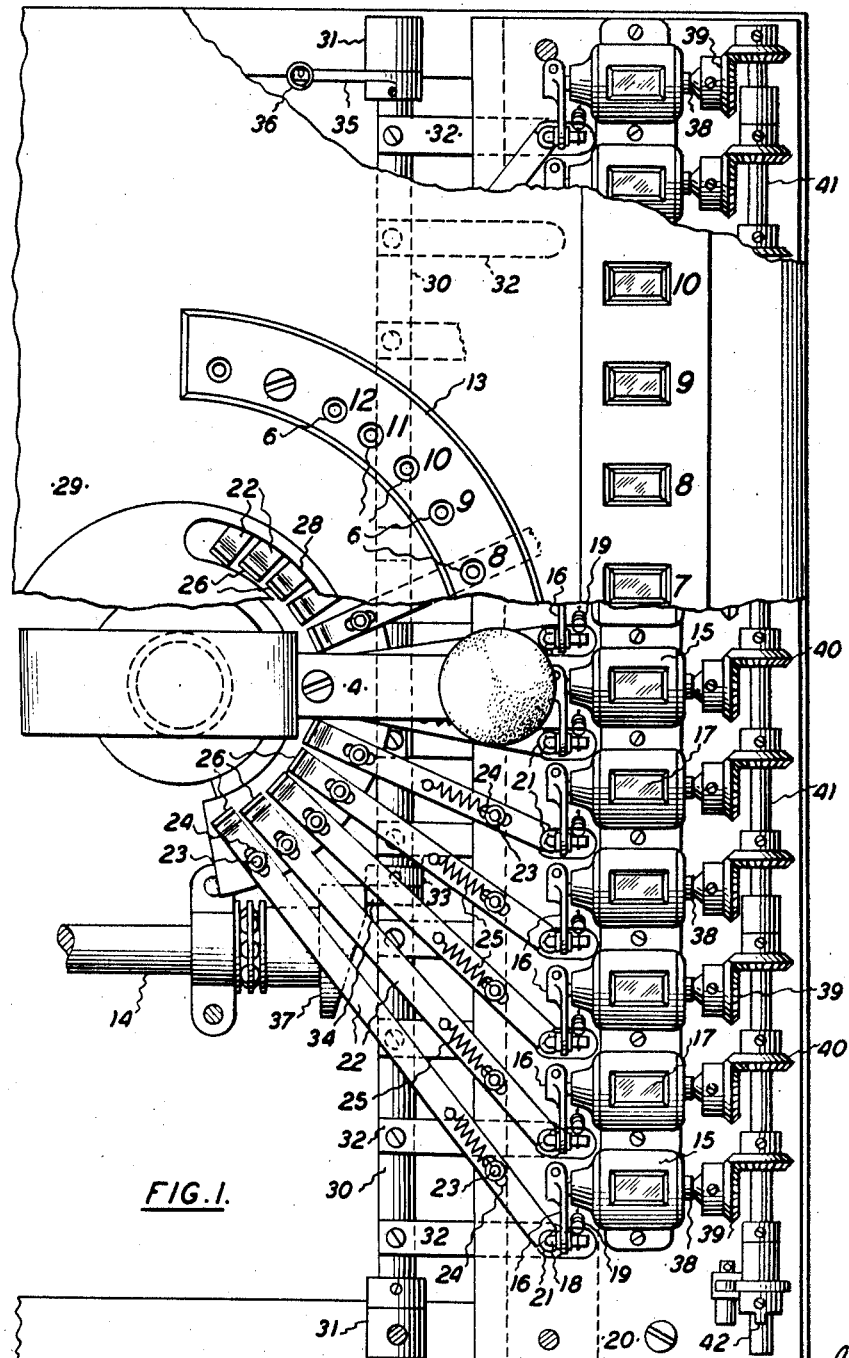
Fig. 1 is an incomplete plan of a ticket issuing machine incorporating the present invention.

The ticket issuing machine includes a selector arm 4 having a plunger 5 which may be entered into any one of a series of dialling holes 6 in a selector dial 13. This action, as is well known, initiates the operation of mechanism whereby a particular ticket is printed and issued. This known mechanism (a suitable form of which is described later herein) includes one or more rotatable spindles, and one of these spindles (indicated at 14) is employed as an actuating agent for the counting mechanism subject hereof.

A counting unit is associated or related with each dialling hole 6 in respect of which an individual count is to be counted. Each counting unit consists of a counter 15 and latch devices whereby the counter is prevented from operating until such time as the plunger 5 is entered into the appropriate dialling hole 6.

The counters 15 are of the known type in which a complete oscillation of a crank web 16 causes the number exhibited through a window 17 to be increased by one. They are preferably of the type marketed under the registered trade-mark "Veeder."

Figure 3:
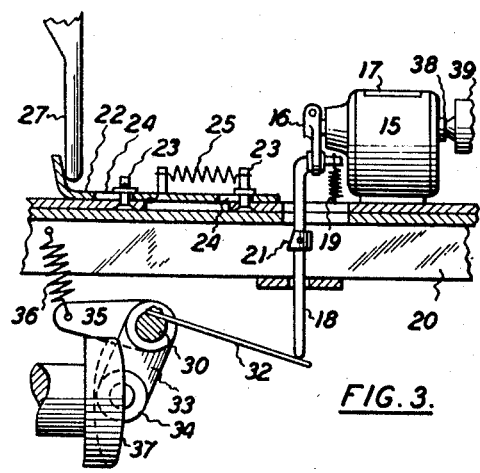

The crank webs 16 each have a push-rod 18 pivoted thereto, and tension springs 19 are anchored to the machine frame 20 and to the webs 16 or the upper ends of the push-rods 18. The springs 19 at all times influence the webs 16 and the push-rods 18 to assume or remain in the positions shown in Fig. 3.

Figure 2:
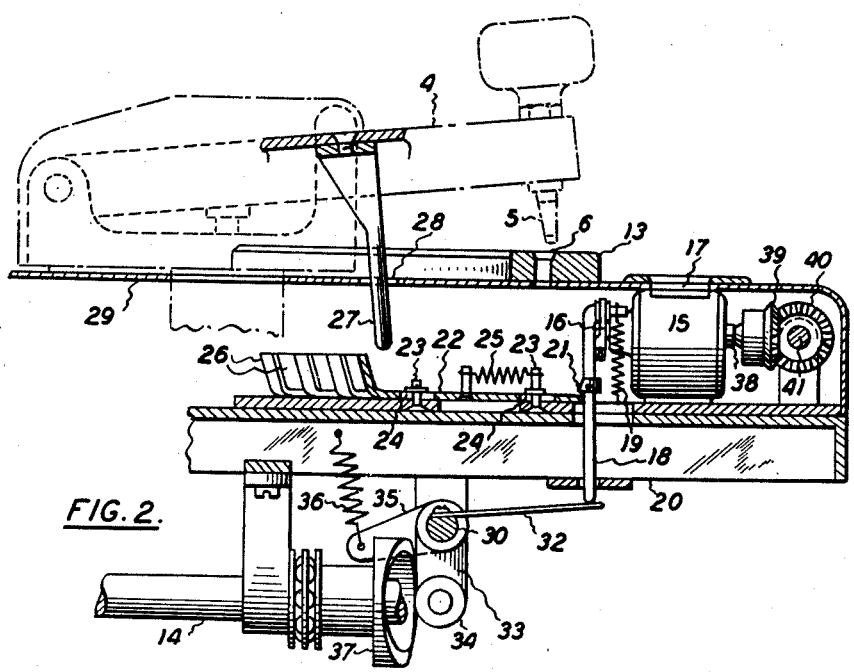
Figs. 2 and 3 are schematic sectional end elevations projected from Fig. 1 and respectively illustrating the mechanism before and just after entrance of the selector arm plunger within a dialling hole.

The latch devices forming a part of each counting unit, in each case consist of a step 21 fixed or formed on the corresponding push rod 18, and a latch bar 22 which is restrained against movement, other than in an endwise direction, by fixed pegs 23 passing through slots 24. Tension spring 25, at all times influences the bar 22 to assume or remain in the position shown in Fig. 2. Each bar 22 has an end abutment 26 adapted for engagement by a striker 27 fixed on the selector arm 4 and protruding through a slot 28 in the cover plate 29 of the ticket issuing machine.

An oscillatable cam follower consists of a rock bar 30 (in bearings 31) spring fingers 32 fixed on said bar, a lever arm 33, a follower roller 34, and a lever arm 35 furnished with a tension spring 36. There is one finger 32 for each push-rod 18. The roller 34 is held against a cam 37 (on shaft 14) by the spring 36, and said cam is fashioned and its speed of revolution selected so that the follower moves through a complete oscillation on every occasion that the machine issues a ticket due to the insertion of the plunger 5 in one of the holes 6.

The counters 15 may be provided with customary individual zero resetting means, but for preference each resetting spindle 38 has a bevel pinion 39 keyed thereon. These pinions 39 mesh with similar pinions 40 all of which are fixed on a main resetting shaft 41. The shaft 41 has dogs 42 for a turning key (not shown) whereby all of the counters 15 may be simultaneously reset to zero.

In use the selector arm plunger 5 is thrust into a dialling hole 6. The striker 27 contacts an abutment 26 thereby withdrawing the corresponding latch-bar 22 from the appropriate push-bar 18. Part rotation of the cam 37 enables the springs 36 and 19 respectively to effect descent of the spring fingers 32 and the appropriate push-rod 18. Further rotation of cam 37 lifts the fingers 32 and this restores the push-rod to its former raised position, thereby increasing the number indicated on the corresponding counter 15 by one. The corresponding spring returned latch bar then replaces its end under the related step 21 thus preventing the push-rod from again descending a sufficient distance to operate its counter until its dial hole is again penetrated by the selector arm plunger, and the follower is re-oscillated.

Ticket issuing machines of the class to which the present invention is applicable, as is well known, include means whereby any one of the mechanisms for the issuance of a particular ticket may be rendered inoperative. This provision is particularly necessary where the ticket issuing machine forms part of a race totalizator, in order that entrance of the plunger 5 into the dialling hole 6 related to a non-starting competitor, will not result in the printing and issue of a ticket. In the event of the plunger 5 being entered into a dialling hole which is "out of action" it is, of course, necessary that no count be made on the associated counter 15. This requirement is met by the shaft 14 (as is the case with the shaft 109 of the mentioned prior patent) rotating only when a ticket is actually being issued, and consequently, although a latch bar 22 may be displaced by the striker 28, a count will not be made on the associated counter 15 in the absence of an oscillation of the cam follower.

Suitable means for rotating shaft 14 only when a ticket is being printed and issued are illustrated in Fig. 4, the operation of these means being as follows.

When the handle 4 is depressed a rod 43 descends against the pressure exerted by a return spring 44. This action causes a bell-crank 45, which is pivotally connected to rod 43 at 46, to turn about shaft 47 thereby causing the free end of bell-crank 45 to slide from under the tip 48 of lever 49. The lever 49 is freely revoluble on shaft 50, and the descent of tip 48, under the influence of tension spring 51, for the time being prevents restoration of the bell-crank 45 to its original position and thereby locks the handle 4 in depressed position. The described movement of lever 49, effects closure of the electrical contacts 52 and 53. Meeting of contacts 52 closes the circuit of a motor 54, and meeting of the contacts 53 closes a "betting" circuit which serially includes conventional distributor 55, competitor adding unit 56, and grand total adding unit 57.

When the distributor 55 makes contact, a circuit is thus completed which causes energization of a trip coil 58. This energization, by attracting spring-loaded armature lever 59, causes release of bell-crank 60 under the influence of spring 61. Movement of bell-crank 60 due to spring 61, allows the betting circuit contacts 62 to open, and effects closure of contacts 63, at the same time causing the tail 64 of bell-crank 60 to descend on to the body of cam 65. Meeting of contacts 63 closes the circuit of magnetic clutch 66, thereby attracting armature plate 67 into operative engagement whereby pinion 68 is rotated by motor 54 through the agency of drive transmission means indicated at 69. Pinion 68 meshes gear 70 fixed on shaft 14. Turning of shaft 14 causes the ticket feed drum 71 to feed a ticket length from a reel (not shown) to between a ticket printing roller 72 and a platen 73, and a cam 74 operates the spring-loaded platen bell-crank 75 thereby effecting the printing of the ticket. By this time the shaft 14 has almost completed a single revolution, and consequently the hump or throw 76 of cam 65 engages under the tail 64 and thereby restores the bell-crank 60 to the position shown (Fig. 4). This action opens the contacts 63 (thereby de-energizing the clutch 66 and consequently halting drive to shaft 14) and re-latches the bell-crank 60 under the lever 59. At the same time a pin 77 on bell-crank 60, engages the underside of lever 49 thus restoring the bell-crank 45 and the contacts 52 and 53 to the initial positions shown in Fig. 4. This restoration of bell-crank 45 allows the spring 44 to raise the handle 4 in readiness for a next operation thereof. By this time the shaft 14 has just completed one revolution and the follower roller 78, on platen bell-crank 75, descends into a detent (under influence of spring 79) in the cam 74, thereby halting the shaft 14 at the point of completion of its single revolution.

Although the present invention has been described, and is primarily intended for use, in connection with the ticket issuing machines of totalizators, it will be clear that it is usable generally in ticket issuing machines of the class herein referred to, irrespective of whether the machine is part of a totalizator.

We claim:

1. In a ticket issuing machine of the class which includes a pivotally mounted depressible selector arm having a plunger thereon, a selector dial having a plurality of dialling holes therein, and a shaft which rotates only when a ticket is issued as a result of said plunger being entered into one of said holes; mechanism for separately counting the number of tickets issued relative to each of said dialling holes, which consists of a striker fixed on said selector arm, a cam adapted for operation by said shaft, an oscillatable follower operatively associated with said cam, and a plurality of counting units each one of which is related to only one of said dialling holes and each of which consists of a counter having an oscillatable crank web thereon, a loading spring for said crank web, a push rod which is pivoted to said crank web and which is engageable with said follower, and latch devices which are able to retain said push rod in a non-operative position and which release said push rod when said selector arm is depressed thereby causing said striker to engage a portion of said latch devices and effect a releasing movement of said devices.

2. In a ticket issuing machine of the class which includes a pivotally mounted depressible selector arm having a plunger thereon, a selector dial having a plurality of dialling holes therein, and a shaft which rotates only when a ticket is issued as a result of said plunger being entered into one of said holes; mechanism for separately counting the numbers of tickets issued relative to each of said dialling holes, which consists of a striker fixed on said selector arm, a cam adapted for operation by said shaft, an oscillatable follower operatively associated with said cam, and a plurality of counting units each one of which is related to only one of said dialling holes and each of which consists of a counter having an oscillatable crank web thereon, a loading spring for said crank web, a push rod which is pivoted to said crank web and which is engageable with said follower, and latch devices which are able to retain said push rod in a non-operative position and which release said push rod when engaged by said striker, said latch devices consisting of a step on said push rod, an endwisely movable latch bar whereof one end is engageable with said step, an abutment on said latch bar which lies in the path of said striker, and a return spring for said latch bar.

GEORGE ALFRED JULIUS.
AWDRY FRANCIS JULIUS.